United States Patent [19]

Keightley

[11] Patent Number: 5,363,217
[45] Date of Patent: Nov. 8, 1994

[54] IMAGE TRANSFER SYSTEM

[75] Inventor: John Keightley, Barnaby, Canada

[73] Assignee: Pthalo Systems, Inc., Barnaby, Canada

[21] Appl. No.: 974,888

[22] Filed: Nov. 12, 1992

[51] Int. Cl.$^5$ ............................................. G03F 3/08
[52] U.S. Cl. .................................. 358/506; 358/491; 358/505
[58] Field of Search ............... 358/506, 487, 491, 490, 358/214, 209, 493, 495, 480, 481, 489, 474; 359/211, 220

[56] References Cited

U.S. PATENT DOCUMENTS

| | | | |
|---|---|---|---|
| 3,426,144 | 2/1969 | Roth | 358/481 |
| 3,816,659 | 6/1974 | Landsman | 358/491 |
| 3,823,276 | 7/1974 | Maslowski et al. | 179/100.3 |
| 3,875,587 | 4/1975 | Pugsley | 358/491 |
| 4,260,997 | 4/1981 | Fukui | 358/491 |
| 4,260,998 | 4/1981 | Fukui | 346/108 |
| 4,525,749 | 6/1985 | Maeda et al. | 358/290 |
| 4,638,370 | 1/1987 | Rosier | 358/293 |
| 4,992,890 | 2/1991 | Pinard et al. | 358/474 |
| 4,996,605 | 2/1991 | Taniguchi et al. | 358/474 |
| 5,026,133 | 6/1991 | Roddy et al. | 350/6.4 |

FOREIGN PATENT DOCUMENTS

| | | | |
|---|---|---|---|
| 0373262A | 12/1988 | European Pat. Off. | H04N 1/06 |
| 0483827A | 10/1991 | European Pat. Off. | G06K 15/12 |
| 1185115 | 7/1968 | United Kingdom | H04N 1/24 |
| 1198655 | 7/1970 | United Kingdom. | |
| 1515606 | 6/1978 | United Kingdom. | |
| 2004160A | 9/1978 | United Kingdom | H04N 1/06 |

Primary Examiner—Edward L. Coles, Sr.
Assistant Examiner—Madeleine Nguyen
Attorney, Agent, or Firm—Joseph W. Berenato, III

[57] ABSTRACT

An image transferring device which consists of a light source transmitter for transmitting a collimated light beam, a light reflector positioned to intercept the collimated light beam, a motor for rotating the light reflector, a film positioned at the focal point of the light reflected from the mirror; an imaging lens mounted so as to rotate with the mirror and to focus the light beam onto film, and a motor and lead screw for advancing the mirror in a direction along its axis of rotation so that the light beam traverses an image portion of the film.

7 Claims, 4 Drawing Sheets

IMAGE TRANSFER SYSTEM

BACKGROUND

The present invention relates to a an image transfer system for the high speed conversion of digital image data to film and for reading film to produce digital image information.

The desire for better resolution for television, video production, broadcasting, motion picture production and other uses has led to the development of high speed scanners. For the present purposes the term scanner will be used to designate an optomechanical system that deflects light and/or moves media to produce motion of a focussed spot or line for the purpose of reading or writing information from/to the media. In this context a scanner designates both a reader which recovers data in digital form from previously recorded media and a recorder which exposes media in accordance with digital data. Early scanners used cathode ray tubes in combination with deflectors. The latter scanners include continuous motion systems which scan line by line and suffer from jitter and weave of the film and stationary systems which customarily used a pin-registered gate to hold the film accurately relative to the perforations. Line scan systems generally operate in real time at a rate of 25 frames per second. Such devices employing electron beams suffer from poor geometric accuracy, a lack of resolution, a lack of uniformity and low optical power which limits both the reading and recording speed. A major reason for the inaccuracy, lack of uniformity and poor resolution is due to the tube electron beam deflection systems and optics required to image the tube face onto the film. The CRT spot size and end use format requirements imposed by broadcast TV requirements result in a limited resolution for such devices.

Scanners have also employed laser rather than CRT beams. Laser telecine machines which convert film to video image data in real time and scan the film line by line have been developed for high definition television. High definition television employs twice as many scan lines as conventional television and hence provides greater resolution- More recent laser systems have achieved high speed but involve relatively complex optics which affect the quality of the imaging. Moreover, the latter systems are not useful when the final format is film for general theatrical release or where the user desires to retain the original film quality for archive, or reformatting purposes. For the latter situations a high resolution over a large area at a reasonably high speed is required.

Accordingly, it is an object of the present invention to provide an improved image transfer system. It is a further object of the invention to provide a high speed film scanner capable of a large scan angle and a small scanning spot. Yet another object is to provide a scanner which is capable of providing high resolution and geometric accuracy independent of image size.

SUMMARY OF THE INVENTION

According to the invention there is provided an image transferring device which includes a light source transmitting means for transmitting a collimated light beam, a rotatable multi-faceted mirror positioned parallel to and so as to intercept the collimated light beam, and means for rotating said mirror. A film is positioned at the focal point of the light reflected from said mirror and a plurality of lenses mounted so as to rotate with the mirror and to focus the light beam onto the film. Means for advancing said mirror in a direction along its axis of rotation are provided so that the light beam traverses an image portion of said film. By positioning the lens to focus the light after the mirror, one can use a collimated light beam with a substantially smaller diameter for the same F/# (focal length/lens aperture) and thereby reduce the lens focal length and proportionally the chromatic aberrations, as well as employ a smaller mirror.

Advantageously, the rotating light reflector may be a multi-facet mirror whose axis of rotation is parallel to the incoming collimated light beam.

The mirror may have multiple facets such that as the mirror rotates the collimated light beam falls onto one facet and then on subsequent adjacent ones, in turn, until light has been reflected from all of the facets. A plurality of lenses may then be mounted on the mirror and each positioned so as to intercept light reflected from a corresponding one of the facets of the mirror and focus it onto the film.

The film may contain an image and include a detector for detecting light passing through the film and an ellipsoidal mirror positioned to reflect a line traced by the light from the mirror onto a spot on a detecting surface of the detector.

The light beam may contain three fundamental color components and include three detectors and two dichroic mirrors positioned so as to reflect an associated color component of the light onto a face of an associated one of the detectors such that all three color components are detectable by corresponding ones of the detectors.

A color filter may be used in the path of light passing through each of the lenses such that there are three different color filters corresponding to the principal colors of white light.

The film may be light sensitive and the beam may be modulated in accordance with input data.

In another aspect of the invention there is provided a method of transferring an image comprising directing a collimated beam of light onto a rotating mirror, reflecting the beam of light through a lens so as to focus it onto a film where it travels along a line segment transverse to a rotational axis of the mirror, and advancing the mirror along its axis so that an image portion of the film is traversed by the beam of light.

The film may be previously exposed and after the light is partially absorbed by the film, the method may further include focusing a line segment of the partially absorbed light onto a light detector. The input beam may be modulated with input data and the reflected, focused light directed onto a light sensitive film.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

Figure 1:
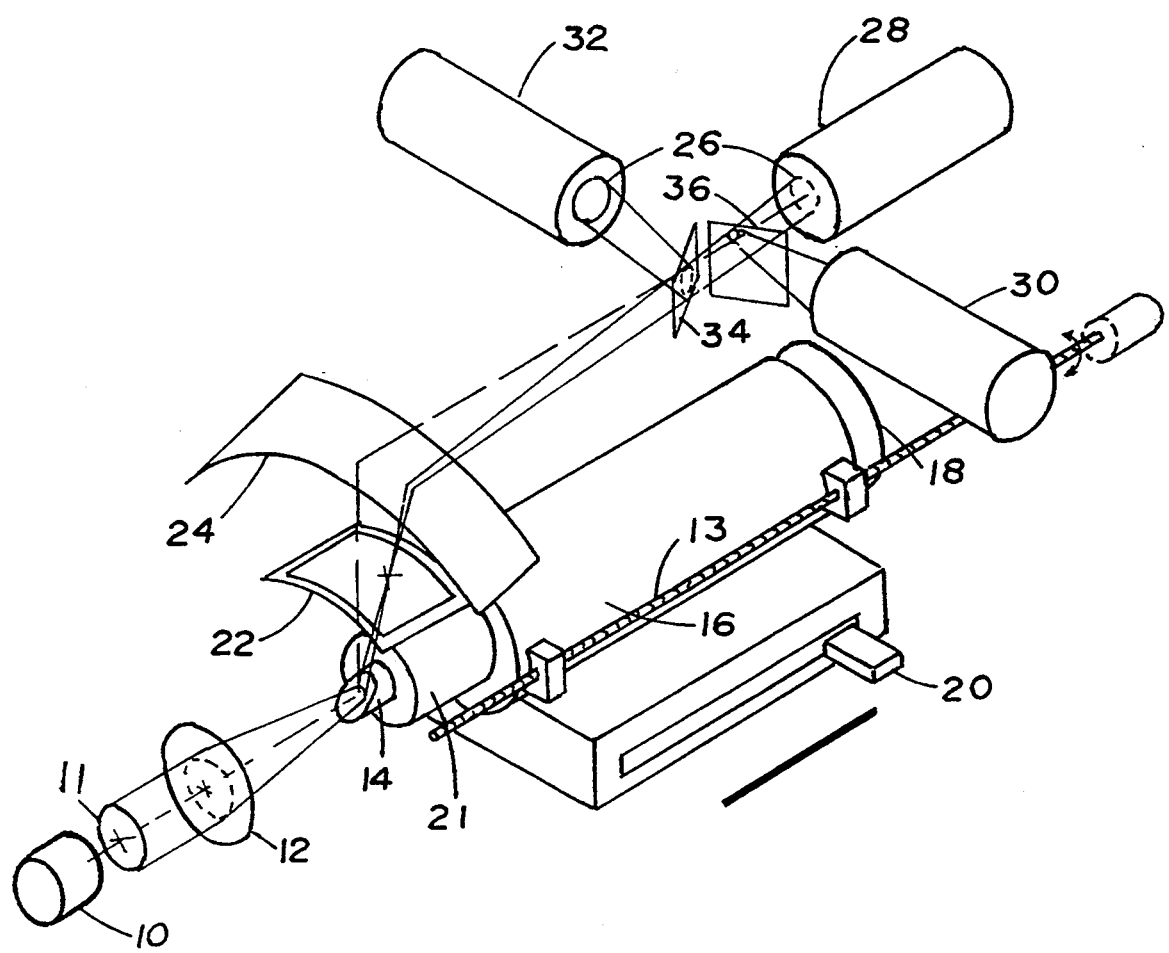
FIG. 1 is a perspective view of an internal drum scanner in accordance with a preferred embodiment of the invention.

Referring to FIG. 1 there is shown in perspective an internal drum scanner consisting of a light source (not shown) from which there is generated a light beam 11. An image lens 12 focuses the beam of light 11 onto the face of a 45° mirror 14 mounted on the axis of cylinder 14. Mirror 21 is rotated by motor 16. An optical rotary encoder 18 is affixed to the shaft of motor 16 in order to indicate its angular position. A lead screw 13 driven by motor 16 causes linear movement of the motor 16 back and forth. A linear encoder 20 provides information as to the axial position of the motor 16 including rotating mirror 14 and ellipsoidal mirror 24. A sheet of film 22 is mounted on the inside surface of a cylinder (not shown). The film 22 can also be mounted on the outside of a cylinder if the cylinder is transparent or there is a cutout to permit light to pass through the image area.

When the scanner is operating as a reader rather than as a film recorder, an ellipsoidal mirror 24 is positioned above the film to reflect a line of light over a wide angle into a small spot 26 at the face of detectors 28, 30 and 32. Dichroic mirrors 34 and 36 each reflect one color component of the light and transmit the others. Consequently, with a three color component input light beam, two dichroic mirrors so placed will cause each color component to impinge on the detector face of an associated one of each of three photomultiplier tubes 28, 30 and 32. In addition to intensity data recorded by the associated photomultiplier, both angular position and linear position are fed to a processor (not shown). The ellipsoidal mirror 24 provides compact scanning capable of uniformly collecting light over a wide angular scan angle. Obviously, the input lens 12, the motor 16 and the 45° mirror and the ellipsoidal mirror 24 all move with the motor.

Figure 2:
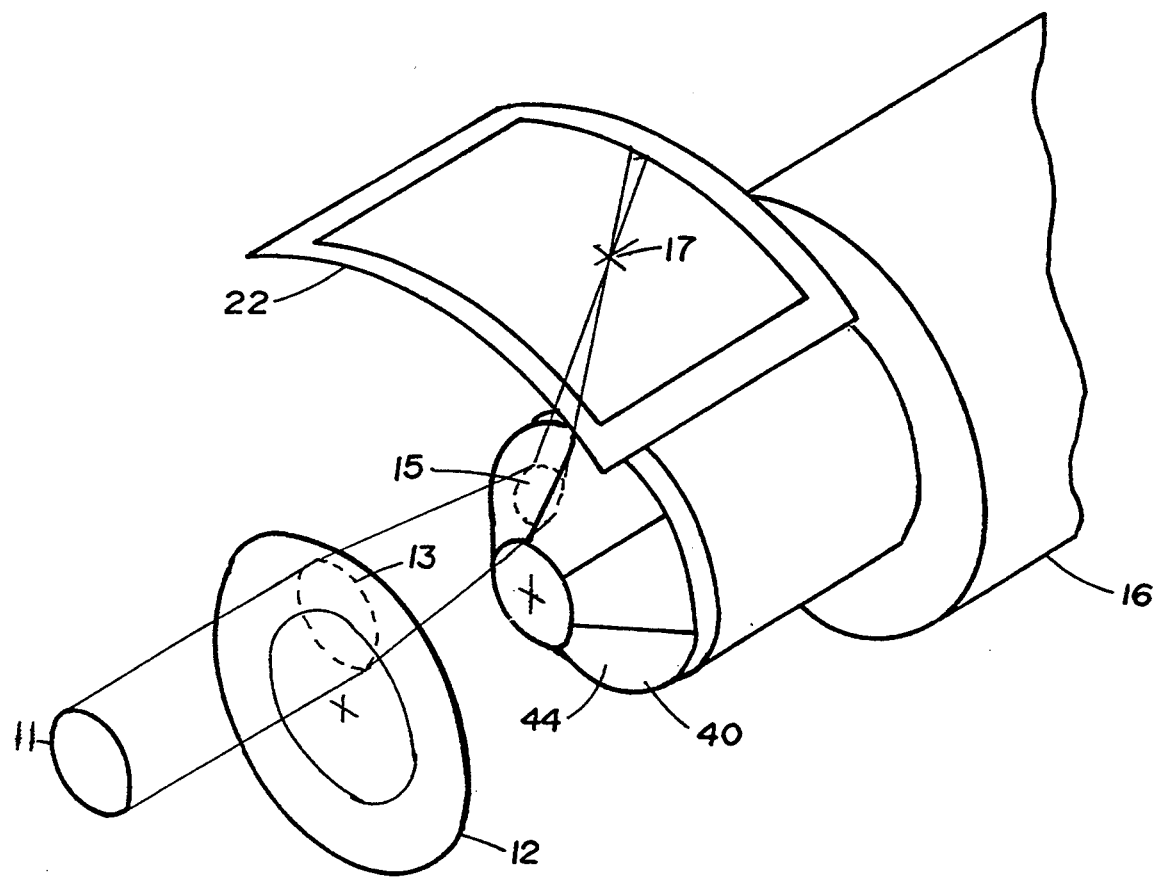
FIG. 2 is a perspective view of an internal drum scanner showing the light path in use with a multi-facet reflector.

Referring to FIG. 2 there is shown a scanner with a multi-facet reflector or mirror 40 mounted on the end of a cylinder 21 driven by motor 16. Mirror 40 has a plurality of inclined planar facets 44. The collimated input light beam 11 is incident on an outer region of the input lens 12 parallel to the axis of the motor 16, rather than on an axial portion thereof, forming a beam spot 15 on one of the facets 44 of mirror 40. The beam facet 44 focuses the light on a cylindrical film 22 at point 17. It will be observed that, in this case, the beam 11 does not travel through the input lens 12 symmetrically with respect to the axis of the motor 16 but is offset from center as shown. Clearly, the larger the diameter of beam 11 the smaller will be the scan angle. The greater the number of facets 44 for a given diameter of the cylinder 21, the smaller will be the scan angle. In fact, the number of facets, the required scan angle, the offset and diameter of the input optical beam, the desired spot size on the film and the focal length of the lens 12 are all interrelated by the geometry of the system. The relationships are well known.

There are two optical means which can be used in scanners for focusing the beam into a small spot, namely, geometric optics using incoherent light such as white light and gaussian optics dealing with coherent light such as a laser beam. For geometric optics the size of the spot after the beam has been imaged by one or more lenses is determined by the size of the object, at least until it gets very small at which point diffraction effects dominate. The F/# (focal length/lens aperture) of the final lens serves only to define the amount of energy passing through the system and should be as small as possible to maximise this amount of energy.

Gaussian optics are concerned with the passage of coherent light through an optical system. In the case of a focussed Gaussian beam the size of the resulting spot is determined by diffraction effects and, thus, by the distribution of energy passing through the system, most importantly at the final lens. The smaller the F/# (F/# is the ratio of the beam diameter to focal length), the smaller is the focussed spot diameter. The amount of energy passing through the system is dependant primarily on the characteristics of the laser itself.

Both geometric and Gaussian optics require low F/#'s for better performance. In the case of high resolution film scanning, these result in F/# requirements of 5 or lower. However, for a fixed focal length it is necessary to increase the lens aperture or effective beam diameter to achieve a low F/#. The large beam diameter then determines the physical size of the system and ultimately the available scan angle.

However, increasing the beam diameter also increases chromatic aberration of the focused beam. Chromatic aberration is caused by the variation in refractive indice of glass with different wavelengths. Thus, in a three color scanner, the three different colors will not be brought to the same focus point. Achromat and apochromat lens designs were developed to correct this problem but are typically expensive and work at only two or three different wavelengths. The absolute chromatic aberration is a function of focal length. Thus, if the focal length can be reduced, the chromatic aberration will be correspondingly reduced.

A multi-facet system provides increased throughput, but because of its increased size requirements it produces a consequent chromatic aberration problem and limits the scan angle.

Figure 3:
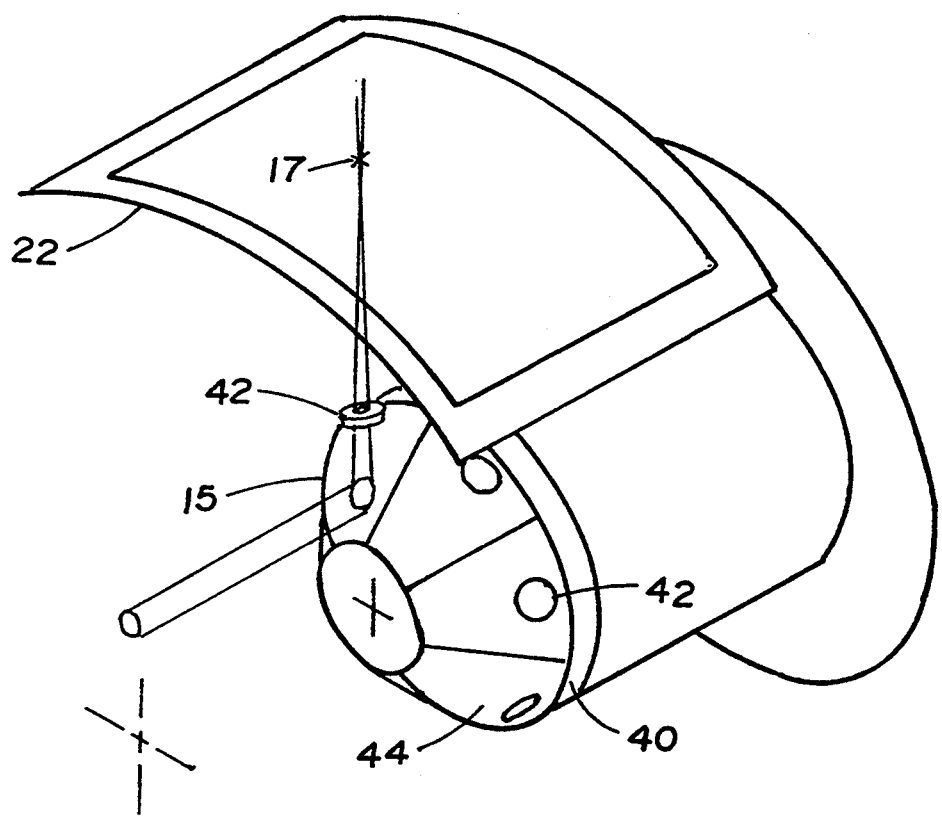
FIG. 3 is a perspective view of an internal drum scanner utilizing a multi-facet reflector in conjunction with multiple lenses around the periphery which rotate with the reflector.

Referring to FIG. 3 there is shown a scanner in which an additional focusing lens is re-positioned on the other side of each of the mirror facets 44 and rotate with the facets. For each facet 44 there is a lens 42 positioned so as to focus light reflected from that facet 44 onto a focused spot 17 on film 22.

Figure 4:
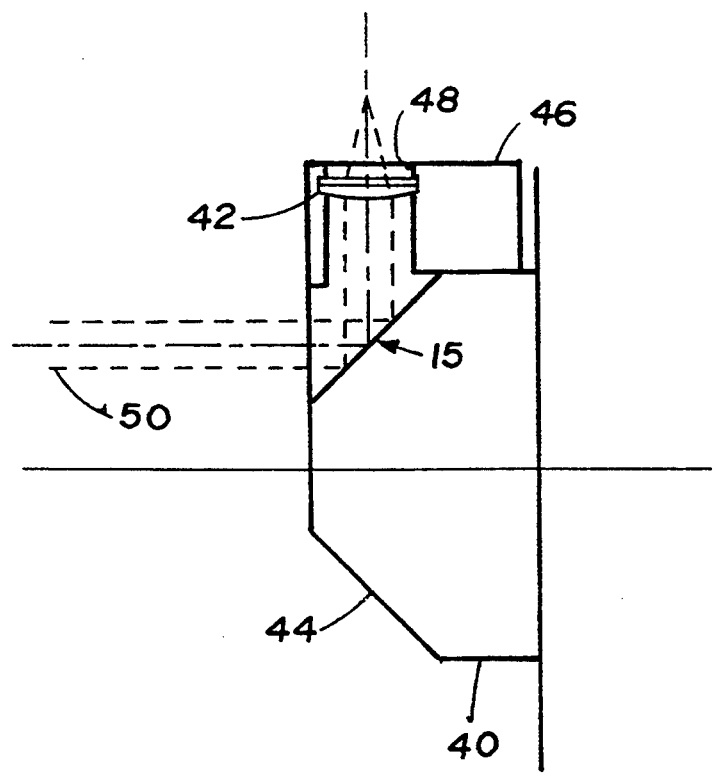
FIG. 4 is a sectional view of the reflector assembly showing the relative positioning of one of the multiple lenses relative to an associated face of one of the multiple faces of the reflector.

Referring to FIG. 4, the mechanical structure for the multi-facet mirror consists of a cylindrical frame 46 mounted over the cylindrical periphery of the mirror 40. The front of the frame 46 is open to admit light beam 50. Each lens 42 is fitted into an opening 48 in frame 46 and is centrally positioned with respect to its associated facet 44 so that as the beam spot 15 on each facet 44 traverses the facet surface due to rotation of mirror 40, the point 17 traverses a line on film 22 which is located at the focal point of the lens assembly. The latter line is transverse to the axis of rotation of mirror 40. In order to achieve a desired scan angle it is necessary to make lenses 42 larger than would be necessary for purely on-axis operation. However, the focusing power of lense 42 can be considerably larger that could that of a single lens 12 positioned as in FIG. 2 (i.e. the focal length can be shorter). Typically, the focal length can be only 1/5th that of the single lens 12 in FIG. 2. Thus, it is possible to operate with a system that has only 1/5th of the beam size of the system of FIG. 2 thereby reducing the size of the mirror 40 and the absolute chromatic aberration. The smaller input beam diameter possible permits either a larger scan angle or more facets to be used.

The embodiments of both FIG. 1 and FIG. 3 can be used with white light, single color light, multiple color light or laser light.

Figure 5:
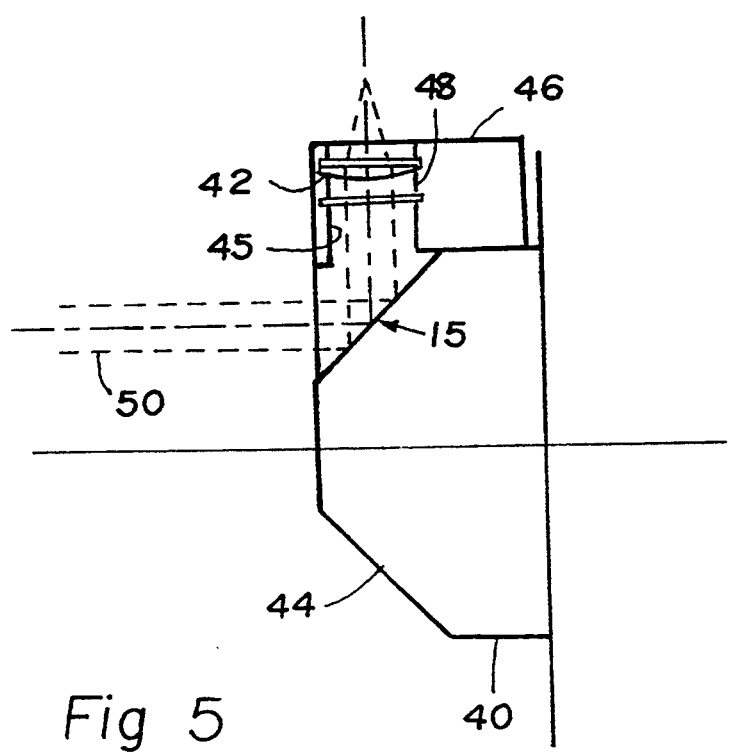
FIG. 5 is a sectional view as in FIG. 4 except showing a color light filter.

A variant of the embodiment disclosed in FIGS. 3 and 4 is disclosed in FIG. 5 in which filters 48 are placed in the light path of light reflected from each of the facets 44 of mirror 40. By using a mirror 40 with 3, 6, 9 etc. facets and placing red, green and blue color filters in front of each lens sequential color scanning is accomplished using a single detector. However, in order to retrace the same line with two subsequent different color filters after the first traversal, the second and third filters must be offset to compensate for continuous scanning. Moreover, the latter variant is limited to fixed line spacing scanning rather than continuous scanning unless the motion to each line were intermittent. However, intermittent operation would substantially decrease the throughput.

Clearly film 22 could be replaced with a light sensitive film and the light beam 11 modulated so as to write on the film in accordance with digital input data. Thus, the system is really a combination film recorder and scanner. As a scanner the light which passes through the image is attenuated by the dyes in the photographic emulsion and thus represents the data at that point in the image. Thus, the recorded image information is in gray scale as opposed to binary.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

I claim:
1. An image transferring device, comprising:
   a) light source transmitting means for transmitting a collimated light beam;
   b) a rotatable mirror having multiple facets positioned parallel to and so as to intercept the collimated light beam such that as said mirror rotates the collimated light beam falls onto one facet and then on subsequent adjacent ones, in turn, until light has been reflected from all of the facets;
   c) means for rotating said mirror;
   d) a film positioned at the focal point of the light beam reflected from said mirror;
   e) a plurality of lenses mounted so as to rotate with said mirror and positioned to intercept light reflected from said mirror and to focus said light beam onto said film; and
   f) means for advancing said mirror in a direction along its axis of rotation so that the light beam traverses an image portion of said film. intercept light reflected from a corresponding one of the facets of said mirror and focus it onto said film.

2. A device according to claim 1, wherein said film contains an image and including a detector for detecting light passing through said film and an elliptical mirror positioned to reflect a line traced by the light from said mirror onto a spot on a detecting surface of said detector and coupled to said advancing means so as to move with said rotating mirror.

3. A device according to claim 1, wherein said light beam contains three fundamental color components and including three detectors and two dichroic mirrors positioned so as to reflect an associated color component of said light onto a face of an associated one of said detectors such that all three color components are detectable by corresponding ones of said detectors.

4. A device according to claim 1, including a color filter in the path of light passing through each of said lenses such that there are three different color filters corresponding to the principal colors of white light.

5. A device according to claim 1, wherein said film is light sensitive and said beam is modulated in accordance with input data.

6. A device according to claim 1, wherein said moving means is a motor, a lead screw and a linear encoder coupled to said motor and operative to generate signals corresponding to the axial position of said rotating mirror and said ellipsoidal mirror.

7. A device according to claim 1, wherein said mirror rotating means is a motor and including a rotary encoder coupled to said motor operative to determine the angular position of said light beam.

* * * * *

UNITED STATES PATENT AND TRADEMARK OFFICE
CERTIFICATE OF CORRECTION

PATENT NO. : 5,363,217
DATED : November 8, 1994
INVENTOR(S) : John Keightley

It is certified that error appears in the above-indentified patent and that said Letters Patent is hereby corrected as shown below:

Column 3, line 19, delete "14" and substitute therefor --21--;

Column 3, line 19, after "Mirror" delete "21" and substitute therefor --14--;

Column 4, line 56, delete "is open" and substitute therefor --has openings 48--;

Column 4, line 67, delete "that" and substitute therefor --than--;

Column 6, lines 16 to 18, delete "intercept light reflected from a corresponding one of the facets of said mirror and focus it onto said film."

Signed and Sealed this

Eleventh Day of July, 1995

*Attest:*

BRUCE LEHMAN

*Attesting Officer*      *Commissioner of Patents and Trademarks*